May 15, 1962  J. E. BANCROFT  3,034,744
MAGNETIC TORQUE TENSION DEVICE
Filed May 12, 1959  2 Sheets-Sheet 1

INVENTOR
JAMES E. BANCROFT
BY Kenneth B Hamlin
ATTORNEY

May 15, 1962

J. E. BANCROFT 3,034,744

MAGNETIC TORQUE TENSION DEVICE

Filed May 12, 1959

INVENTOR
JAMES E. BANCROFT
BY Kenneth B Hamlin
ATTORNEY

United States Patent Office 3,034,744
Patented May 15, 1962

3,034,744
MAGNETIC TORQUE TENSION DEVICE
James E. Bancroft, Bayside, N.Y., assignor to Allied Control Company, Incorporated, New York, N.Y., a corporation of New York
Filed May 12, 1959, Ser. No. 812,622
5 Claims. (Cl. 242—155)

The present invention relates to magnetic torque devices and more particularly to such devices of the hysteresis type utilized to control the tension of moving elongated filaments such as threads or yarns.

Hysteresis torque devices characteristically develop substantially constant torque and are thus particularly useful as braking or tensioning devices in winding and reeling operations. For example, such devices are used in the textile industry to maintain a traveling yarn under controlled tension during winding or beaming operations. In such devices, one or more turns of a single yarn are trained about the periphery of a rotatable capstan or wheel in such a manner as to rotate the capstan in response to the travel of the yarn. The rotatable capstan is operatively connected to a rotatable armature or rotor which is axially positioned in the magnetic field of a field member. The armature rotates with respect to the field member in response to the travel of the yarn and the rotation of the capstan. When the field member is energized by an electric current, a magnetic couple is produced between the rotating armature and the field member. This magnetic couple tends to oppose the rotation of the armature and results in a tension being applied to the traveling yarn.

The known tension devices of the general type described above have inherent disadvantages which make them unsatisfactory in one or more respects. For example, a wide range of tensions is required in the textile industry for various types of operations performed with various types and sizes of yarn. Although some of the known tension devices are adjustable to provide a limited range of tensions for a particular type and size of yarn, these devices are unable, because of various limitations, to provide satisfactorily the complete range of tensions required. This has necessitated the use of several different types and sizes of tension devices in the textile industry.

It is known that the magnetic torque, and hence the resulting tension produced by devices of the general type described above, may be changed by varying the magnetic flux which couples the rotating armature and field members. This has been accomplished heretofore in a number of ways. For example, in the known tension devices which comprise a rotatable armature and field member having overlapping, coacting concentric faces opposed to each other, the torque is changed by axially shifting the rotatable concentric ring armature member with respect to the stationary field member to vary the area of overlapping between the opposed concentric faces of the two. In other known tension devices which utilize a rotatable disk coacting with a stationary field member, the air gap between the disk and pole faces of the field member is changed by axially shifting the disk with respect to the stationary field member to vary the magnetic coupling between the two. In both of these known devices, the wheel or capstan about which the arm is trained is operatively connected to the rotatable armature, and the axial movement of the armature also alters the position of the capstan with respect to the inlet and outlet yarn guides. This necessitates the readjustment of the position of the inlet and outlet yarn guides each time the axial position of the rotatable capstan is altered. Other types of known devices utilize adjustable shunts to vary the magnetic coupling between the armature and the field members. These adjustable shunts substantially increase the cost of manufacture of such devices.

It is also known that the tension provided by hysteresis torque devices of the general type described above may be changed by varying the electric current energizing the field member. This correspondingly varies the magnetic couple between the rotating armature and field members. It has been found that, although manufactured under strict conditions and with close tolerances, the known units have slightly different characteristics so that if a voltage of the same magnitude is applied to energize respective field members of a number of units the resulting tensions will not be uniform. In textile operations where hundreds of such tension devices are utilized to control the tension of individual yarns drawn from individual supply spools on a creel to a beaming machine, it is imperative that a substantial uniform tension be maintained on all the individual yarns. Still more important is that it is advantageous to vary simultaneously by a single control the tension provided by a large number of such tension units and still maintain uniformity of tension. Although reasonable uniformity of tension for a number of known devices is attainable by individually adjusting each of the devices, uniformity is lost when a simultaneous change in tension is attempted for all of the devices. This necessitates a readjustment of the individual units.

A further disadvantage of known tension devices of the general type described above is attributable to the fact that no provision is made to prevent the multiple turns of yarn trained about the periphery of the rotatable capstan or wheel from overlapping or rubbing together as the yarn is drawn through the devices from the supply spool. This overlapping or friction frequently results in damage to or breakage of the yarn. This difficulty has been partially alleviated in certain of the known devices when operated at specific predetermined tensions by dividing the periphery of the capstan into three sections, the lower section tapered at a relatively sharp angle, an intermediate section tapered at a smaller angle than the lower section, and an upper section tapered at a smaller angle than the intermediate section. The yarn is directed onto the periphery of the capstan of these known devices at the intermediate section and after one or more turns around the periphery leaves the capstan from the upper section. Because of the specific taper of the three sections of the periphery of the capstan, the yarn tends to move upwardly as the capstan rotates in response to the travel of the yarn. As long as these tension devices are operated at the specific predetermined tension for which they were designed, there is no appreciable overlapping or rubbing between the turns of yarn on the periphery of the capstan. However, when the yarn tension is changed by adjusting the device in the manner described above, overlapping of the turns of yarn and friction between the turns of the yarn result.

It is an object of the present invention to provide an improved tension device which is free of the above-described disadvantages and limitations.

Another object of the present invention is to increase the range of selectable yarn tensions provided by tension devices of the type described above.

It is a further object of the present invention to provide an improved tension device of the general type described above which is capable of being jointly controlled with a plurality of the devices from a single control to provide a greater range of tensions while maintaining substantial uniformity of tension provided by each of the individual devices.

It is another object of the present invention to provide tension devices of the general type described above which when utilized with a plurality of the devices to provide uniform tensions on a plurality of traveling yarns will require no individual adjustment when the tension provided by all the devices is varied by a single external control.

It is also an object of the present invention to provide a simple and reliable adjustment to determine the torque developed by tension devices of the type described above which does not require a change in the voltage energizing the field member, which does not require an axial displacement of the armature with respect to the field member, and which does not require separate shount members.

It is an additional object of the present invention to eliminate overlapping and friction between the multiple turns of yarn trained about the periphery of a tension device of the type described above for a greater range of selectable yarn tensions.

It is a further object of the present invention to provide an improved tension device of the type described above which is inexpensive to manufacture, easy to adjust, reliable in operation, requires less maintenance, and is compartively small in physical size.

These and other objects are attained in illustrative embodiments of a hysteresis torque tension device in accordance with the present invention which comprise a stationary field member, a rotor member concentrically mounted with respect to the field member and rotatable thereabout, and a rotatable capstan operatively connected to the rotor. The field member comprises a coil positioned between a pair of pole spiders. Each of the pole spiders comprises a circular disk having a plurality of triangularly shaped pole pieces equally spaced about the circumference thereof and perpendicular thereto. The pole spiders are positioned at opposite ends of the coil such that the pole pieces of one pole spider extend toward and are interdigitated with the pole pieces of the other pole spider to form an annular series of pole pieces. When the coil is energized by an electric current, adjacent ones of the pole pieces are oppositely polarized and establish magnetic fields of opposite polarity therebetween.

The rotor is formed of a high coercive force magnetizable material having a large hysteresis loss characteristic and is concentrically positioned with respect to the annular series of pole pieces of the field member such that the cylindrical interface of the rotor is spaced from and out of contact with the outer faces of the pole pieces. The flux path of the magnetic field between adjacent pole pieces of the field member is partially completed through the adjacent portion of the rotor which results in the magnetization thereof. As a result of the magnetization of the successive portions of the rotor ring which are adjacent the annular series of oppositely polarized pole pieces, a magnetic couple is established between the pole pieces and the rotor which tends to prevent rotation of the rotor.

When the capstan is rotated by the traveling yarn trained about the periphery thereof, the rotor is also rotated and causes the magnetization of each portion thereof to be reversed due to the recurrent passage by adjacent pairs of pole pieces of opposite polarity. As a consequence of the hysteresis loss resulting from the repeated reversals of magnetization in portions of the rotor, a braking force or torque is applied to the rotor. This braking force applied to the rotor results in a tension being applied to the traveling yarn which is rotating the capstan.

In accordance with one feature of the present invention, one of the pole spiders of the field member may be adjustably rotated with respect to the other to vary the air gap between adjacent pole pieces of the annular series of pole pieces to change the reluctance of the magnetic path therebetween. This varies the amount of magnetic flux which enters the portions of the rotor adjacent the pole pieces and results in a change in the strength of the magnetic couple established between the rotor and the pole pieces of the field member. Accordingly, the tension applied to the traveling yarn may advantageously be varied without the use of separate shunt members between the rotor and the field member pole pieces, without altering the axial position of the rotor with respect to the field member, and without altering the position of the rotatable capstan with respect to the inlet and outlet yarn guides.

In accordance with another feature of the present invention, the capstan about which the traveling yarn is trained is formed with a substantially cylindrical upper surface making a continuous and uninterrupted transition into a curvature concavely forming an outwardly flared lower surface. The yarn from a supply spool is fed through an inlet yarn guide onto the lower outwardly curved surface of the capstan, and after one or more turns are trained about the periphery the yarn leaves the capstan from the upper cylindrical surface and is fed through an adjustable yarn guide. Because of the peripheral face of the capstan is a continuous upward curve until the upper cylindrical surface is reached, the yarn will tend to move or ride upwardly from the inlet yarn guide to the outlet yarn guide as the capstan rotates in response to the movement of the yarn. Thus the multiple turns of yarn are prevented from overlapping or rubbing together as the yarn is drawn from the supply spool through the tension device of the present invention. Furthermore, because the peripheral face of the capstan has no irregularities or indentations, but is a smooth and uninterrupted curvature from the outwardly flared lower surface of the substantially cylindrical upper surface, the multiple turns of a traveling yarn trained thereabout will be prevented from overlapping or rubbing together for a substantial range of selectable yarn tensions at which the tension device of the present invention may be operated.

It is a further feature of the present invention that a slight pretension be applied to the traveling yarn before it is trained about the periphery of the capstan. This pretension acting in combination with the novel peripheral face of the capstan described above prevents the multiple turns of yarn from closing on each other or over-lapping for a much larger range of selectable outlet yarn tensions. This pretension is attained in one illustrative embodiment of the invention by positioning the inlet yarn guide relatively close to the periphery of the capstan and in line with the central axis thereof such that the traveling yarn makes a reltaively sharp bend in passing through the guide onto the periphery of the capstan. Thus the inlet yarn guide not only serves to guide the traveling yarn onto the lower outwardly curved surface of the capstan but also applies a frictional drag to the yarn which results in a slight pretension thereof. A further distinct advantage concomitantly attained is the increase in the friction between the peripheral surface of the capstan and the longer length of yarn trained thereabout. Accordingly, the tensions provided by the tension device of the present invention may advantageously be varied over a substantial range without the heretofore experienced difficulty of having the multiple turns of yarn close or rub together.

In furtherance of the above feature and in accordance with still another feature of the present invention, an adjustable pretension device is positioned between the inlet yarn guide and the rotatable capstan, such that a selectable pretension is applied to the moving yarn before it is directed onto the lower outwardly curved surface of the periphery of the capstan. This enables the tension device of the present invention to be advantageously adjusted to provide a still much greater range of selectable yarn tensions without experiencing any difficulty due to over-lapping or friction between the turns of yarn trained about the periphery of the capstan.

In accordance with another feature, each of the tension devices of the present invention is provided with an individual electrical adjustment which is utilized in combination with the individual magnetic reluctance adjustment described above to adjust individually the devices so that a plurality of the devices will advantageously provide substantially uniform tensions at any selected operating voltage within the complete range for which the devices are designed. In accordance with this aspect of the present invention, after each of the devices is assembled, the field member thereof is energized by a first preselected voltage the magnitude of which is in the upper region of the operating voltage for which the device is designed. This voltage, for example, may be approximately 75 percent of the maximum operating voltage. One pole spider of the field member is then adjustably rotated with respect to the other pole spider to vary the reluctance of the magnetic path between the adjacent pole pieces so as to adjust the device to provide a first predetermined tension. The field member is then energized by a second preselected voltage the magnitude of which is in the lower region of the operating voltage for which the device is designed. For example, this voltage may be 25 percent of the maximum operating voltage. A resistance in series with one of the input conductors to the field member coil is then varied to vary the current flowing in the coil so as to adjust the device to provide a second predetermined tension. Because the above-described adjustments, the magnetic reluctance adjustment, and the field current adjustment, are not independent in varying the tension provided by the devices, they are alternately repeated until each of the devices provides the predetermined tensions at both the preselected high and low voltages. In this manner the tension versus voltage characteristic of the tension devices of the present invention, adjusted by the above-described procedure, all have two points of coincidence, one in the higher operating range of selectable tension and one in the lower operating range of selectable tension. Accordingly the tension versus voltage characteristic of all the devices over the complete range of operating voltage will be substantially identical. Thus a plurality of the tension devices of the present invention may be controlled by a single control to vary simultaneously the tensions provided by all the devices while maintaining substantial uniformity thereof. Furthermore, because of the substantial identity of the tension versus voltage characteristic for the devices of the present invention, substantial uniformity of tension is maintained over a wider range of selectable tensions. As a result of the above-described adjustment procedure, the tension devices of the present invention may advantageously be manufactured and assembled under less rigid requirements thus substantially reducing the cost thereof while concomitantly providing the advantageous features described above.

The foregoing and other objects and features of the present invention will be more readily understood from the following description of illustrative embodiments thereof when read with reference to the accompanying drawing in which.

Figure 2:
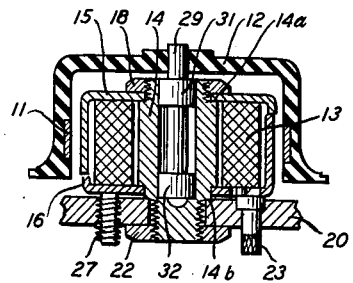
FIG. 2 is a diametrical sectional view of the field member, capstan and rotor member of the tension device of the present invention shown in operative relationship.
Figure 1:
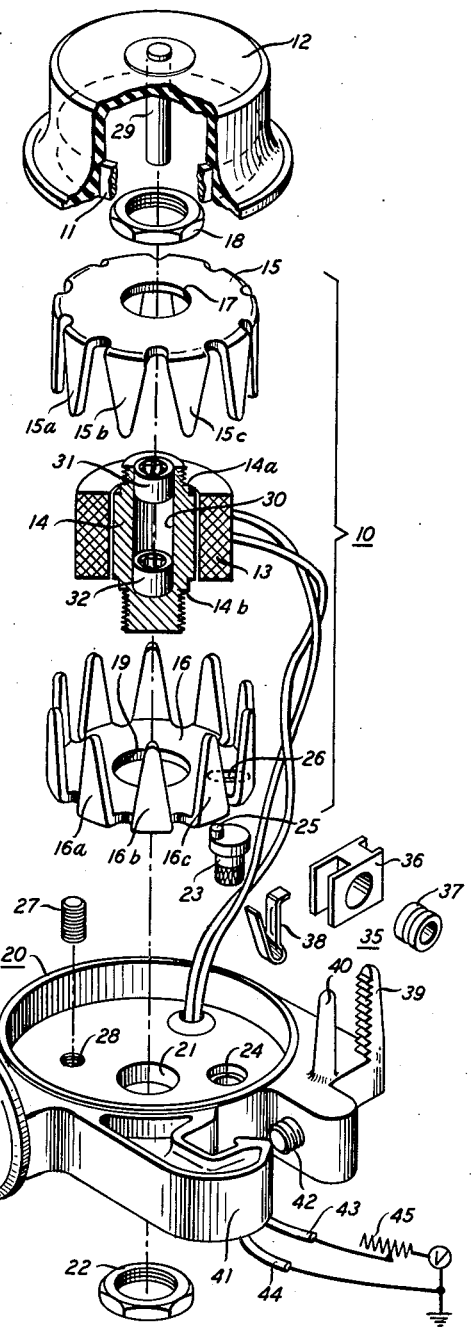
FIG. 1 is an exploded view in perspective of one illustrative embodiment of a tension device in accordance with the principles of the invention.
Figure 3A:
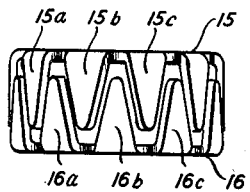
FIG. 3A is a side elevation view of the two pole spiders of the field member of the tension device of the present invention in one relative position.

Referring now to the drawing, illustrative embodiments of a tension device in accordance with the present invention will be described in detail. FIG. 1 is an exploded view in perspective of one such embodiment which comprises generally a field member 10, a rotatable armature or rotor 11, a capstan 12 and supporting frame 20. Field member 10 comprises a coil 13 concentrically mounted on core 14, an upper pole spider 15, and a lower pole spider 16. Pole spiders 15 and 16 each comprises a circular disk of ferromagnetic material having a plurality of triangularly shaped pole pieces, such as pole pieces 15a, 15b, 15c, et cetera, on pole spider 15 and pole pieces 16a, 16b, 16c, et cetra, on pole spider 16, equally spaced about the circumference thereof, perpendicular thereto and integral therewith. Pole spider 15 has a central aperture 17 to receive core 14 and is fixedly secured thereto as shown in FIG. 2 in abutment with circumferential rib 14a thereof by means of a tight press fit or by means of a nut 18 as shown in the drawing. Lower pole spider 16 has central aperture 19 to receive circumferential rib 14b of core 14 and is adjustably rotatable with respect thereto. Supporting frame 20 has central aperture 21 to receive core 14 which is fixedly secured thereto as shown in FIG. 2 in abutment with circumferential rib 14b by means of nut 22. Circumferential rib 14b provides axial clearance between the upper surface of supporting frame 20 and the lower surface of pole spider 16 to enable pole spider 16 to be adjustably rotatable with respect to pole spider 15. As shown in FIGS. 2 and 3A of the drawing, pole pieces 15a, 15b, 15c, et cetera, of pole spider 15 project downwardly and are interdigitated with pole pieces 16a, 16b, 16c, et cetera, of pole spider 16 which project upwardly. Alternate pole pieces 15a, 16a, 15b, 16b, 15c, 16, et cetera, form an annular series of pole pieces circumscribing coil 13.

Pole spider 16 is adjustably rotatable through a small arc by the rotation of knob 23 which projects downwardly, as shown in FIG. 2, through countersunk aperture 24 in supporting frame 20. Eccentrically mounted on the upper end of knob 23 is a small cylindrical cam 25 which cooperates with the side walls of elongated slot 26 in pole spider 16 to cause pole spider 16 to rotate through a small arc in response to the rotation of knob 23. Pole spider 16 is clampable in a fixed position with respect to pole spider 15 by set screw 27 extending through threaded aperture 28 in supporting frame 20.

Figure 3B:
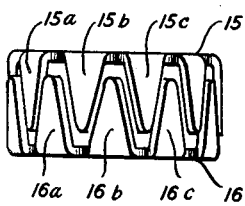
FIG. 3B is a view similar to FIG. 3A showing an illustrative relative position of the pole spiders after one has been adjustably rotated with respect to the other.

FIG. 3A shows pole spiders 15 and 16 positioned with respect to each other such that the air gaps between adjacent pole pieces 15a—16a, 16a—15b, 15b—16a, et cetera, are substantially equal. FIG. 3B shows an illustrative relative position of pole spiders 15 and 16 after pole spider 16 has been adjustably rotated as described above. It will be observed that the air gaps between pole pieces 15a—16a, 15b—16b, 15c—16c, et cetera, have been substantially reduced while the air gaps between pole pieces 16a—15b, 16b—15c, et cetera, have been substantially increased.

Capstan 12 about which one or more turns of a traveling yarn are trained is formed of a nonmagnetic material by means of any suitable molding or machining operation known in the art. As shown in the drawing, the periphery of capstan 12 about which a yarn is trained has a substantially cylindrical upper surface which makes a continuous and uninterrupted transition into a curvature concavely forming an outwardly flared lower surface. Capstan 12 is fixed to a hardened steel shaft 29 in any suitable manner. Rotor 11 is formed of a high coercive force magnetizable material having a large hysteresis loss characteristic and is concentrically mounted on the inner surface of capstan 12 as shown in FIGS. 1 and 2 in any suitable manner.

Core 14 of field member 10 has an axial hole 30 fitted with bearings 31 and 32 which rotatably receive shaft 29 of capstan 12. When shaft 29 of capstan 12 is operatively positioned in axial hole 30 of core 14 as shown in FIG. 2, the unitary structure comprising capstan 12 and rotor 11 is concentrically rotatable with respect to field member 10. In this operative position rotor 11 is axially centered with respect to the annular series of pole pieces of field member 10, and the cylindrical interface of rotor 11 is spaced from and out of contact with the outer faces of the pole pieces.

Mounted on and integral with supporting frame 20 is inlet yarn guide 33 having a replaceable trumpet 34. The aperture in trumpet 34, through which the traveling yarn is directed to the lower outwardly curved surface of capstan 12, is in line with the central axis of capstan 12. Adjustable outlet yarn guide indicated generally in the drawing as 35, through which a traveling yarn leaving the cylindrical upper surface of capstan 12 is directed, comprises vertical members 39 and 40 which are integral with supporting frame 20, guide 36 with replaceable bushing 37, and spring 38. Vertical member 39 has a plurality of gear teeth and thus forms a small rack which engages a plurality of like gear teeth on guide 36. Guide 36 is held in engagement with vertical member 39 at a selected position by spring 38. Guide 36 may be raised or lowered to a selected position by manually compressing spring 38 against vertical member 40 with guide 36, raising or lowering guide 36 to the selected position and releasing the compression of spring 38 which forces the teeth of guide 36 into engagement with the teeth of vertical member 39 at the selected position. Supporting frame 20 is also provided with an integral bracket indicated generally as 41 which is clamped to a vertical upright rod or pipe not shown in the drawing by means of set screw 42.

When field member 10 is energized by a direct current from source V applied to leads 43 and 44 through a variable resistance 45, adjacent ones of the annular series of pole pieces of field member 10 are magnetized to opposite polarities and establish magnetic fields of opposite polarity therebetween. For example, if pole pieces 15a, 15b, 15c, et cetera, of pole spider 15 are polarized "N," pole pieces 16a, 16b, 16c, et cetera, of pole spider 16 will be polarized "S" and the polarity of the magnetic field established between pole pieces 15a and 16a, for example, will be opposite to the polarity of the magnetic field established between pole pieces 16a and 15b. The flux path of the magnetic fields between adjacent pole pieces is partially completed through the adjacent portions of rotor 11 which results in the magnetization of these portions of rotor 11. As a result of the magnetization of the successive portions of rotor 11, a magnetic couple is established between the pole pieces of field member 10 and rotor 11 which tends to prevent rotation of the rotor.

When capstan 12 is rotated by a traveling yarn trained about the periphery thereof, rotor 11 is also rotated which causes the magnetization of each of the portions thereof to be reversed due to the recurrent passage by adjacent pairs of pole pieces of opposite polarity. As a consequence of the hysteresis loss resulting from the repeated reversals of magnetization in the magnetized portions of rotor 11, a braking force or torque is applied to rotor 11. Because rotor 11 is fixedly mounted in capstan 12, the braking force applied to rotor 11 results in a tension being applied to the traveling yarn which is trained about and causes the rotation of capstan 12.

In accordance with one aspect of the present invention, the strength of the magnetic couple between rotor 11 and the pole pieces of field member 10 is advantageously adjustable by the rotation of pole spider 16 with respect to pole spider 15. As described above, this changes the length of the air gap between adjacent pole pieces of the annular series of pole pieces and results in a change in the reluctance of the magnetic path therebetween. As shown in FIG. 3B, the air gap between pole pieces 15b and 16b, for example, is substantially decreased and hence a greater amount of the magnetic flux which is directed from pole piece 15b to pole piece 16b will follow this low reluctance path in place of the previous path which was completed through a portion of rotor ring 11 adjacent thereto. It will also be observed that the air gap between pole pieces 16a and 15b, for example, has been substantially increased and is greater than the air gap between the faces of pole pieces 16a and 15b and the rotor ring 11. Hence more of the flux will be directed between pole piece 15b and pole piece 16b and less flux will be directed between pole piece 15b and pole piece 16a. The air gaps between other adjacent pole pieces are correspondingly changed. The change in the magnetic reluctance of the air gaps between adjacent pole pieces changes the amount of flux which is induced into the rotor 11 and hence varies the strength of the magnetic couple between the rotor 11 and the annular series of pole pieces. This results in a change in the tension applied to a traveling yarn trained about the periphery of capstan 12. The above-described adjustment is advantageously made by unscrewing set screw 27, adjusting knob 23 to obtain the desired tension, and then retightening set screw 27. According, the tension applied to a traveling yarn trained about capstan 12 may advantageously be varied without the use of separate shunt members between the rotor 11 and the pole pieces of field member 10, without altering the axial position of rotor 11 with respect to field member 10, and without altering the position of capstan 12 with respect to the inlet yarn guide 33 and outlet yarn guide 35.

Figure 4:
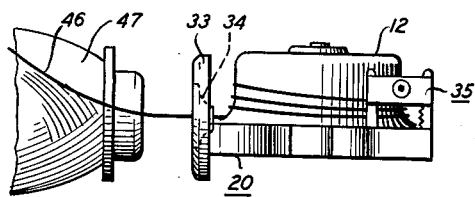
FIG. 4 is a side elevation view of the embodiment of the invention shown in FIG. 1.

As shown in FIG. 4, yarn 46 from a supply package 47 is directed through the aperture in trumpet 34 of inlet yarn guide 33 onto the lower outwardly curved surface of capstan 12. One or more turns of yarn 46 are then trained about the periphery of capstan 12 and yarn 46 is directed therefrom through adjustable outlet yarn guide 35. Because the peripheral face of capstan 12 is a continuous upward curvature from the outwardly flared lower surface to the substantially cylindrical upper surface, yarn 46 will tend to move or ride upwardly from inlet yarn guide 33 to outlet yarn guide 35 as capstan 12 rotates in response to the travel of yarn 46. Because of the smooth and uninterrupted curvature of the peripheral surface of capstan 12, the multiple turns of yarn trained thereabout are prevented from overlapping or rubbing together as yarn 46 rotates capstan 12 for a substantial range of yarn tensions at which the device is selected to operate.

Figure 5:
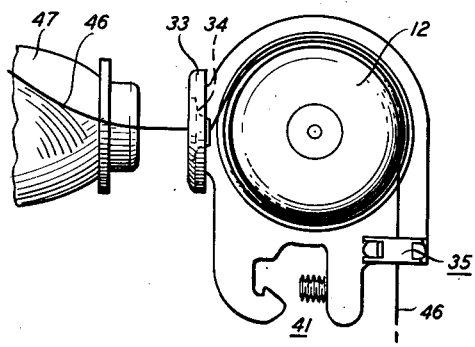
FIG. 5 is a plan view of the embodiment of the invention shown in FIG. 1.

As shown in FIG. 5, inlet yarn guide 33 is positioned with respect to capstan 12 such that the aperture in trumpet 34 is directed onto the lower outwardly curved surface of capstan 12 and in line with the central axis thereof. Inlet yarn guide 33 is also positioned relatively close to the peripheral surface of capstan 12 such that yarn 46 directed through the aperture in trumpet 34 of inlet yarn guide 33 makes a relatively sharp bend when trained about the peripheral surface of capstan 12. Thus trumpet 34 of inlet yarn guide 33 places a slight frictional drag on traveling yarn 46 and this slight pretension, acting in combination with the novel peripheral face of capstan 12, prevents the multiple turns of traveling yarn 46 trained about capstan 12 from closing on each other or overlapping for a larger range of selectable yarn tensions at which the tension device of the present invention is operated. A further advantage resulting from the positioning of inlet yarn guide 33 in the position shown in FIG. 5 is that an increase in the friction between the peripheral surface of capstan 12 and the longer length of yarn 46 trained thereabout is attained.

Figure 6A:
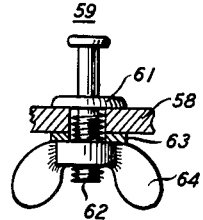
FIG. 6A is an enlarged cross-sectional view of the adjustable pretension device utilized in the embodiment of the tension device shown in FIG. 6.
Figure 6:
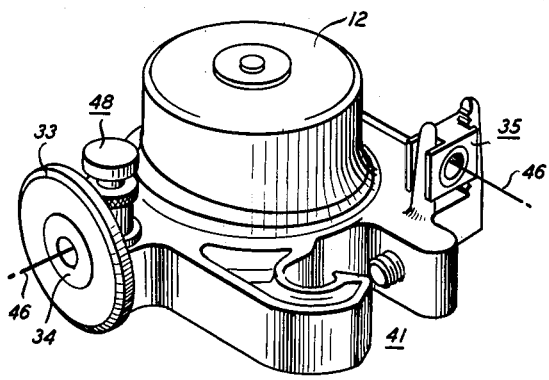
FIG. 6 is a perspective view of another embodiment of the tension device of the present invention showing an illustrative embodiment of an adjustable pretension device.

FIG. 6 is a perspective view of another illustrative embodiment of a tension device which comprises the same elements as the embodiment shown in FIGS. 1 through 5, which elements are identified by corresponding reference numerals. In addition, and in accordance with an aspect of the present invention, the illustrative embodiment shown in FIG. 6 advantageously includes an adjustable pretension device indicated generally as 48 positioned between inlet yarn guide 33 and capstan 12. As shown in FIG. 6A, adjustable pretension device 48 comprises a cylindrical member 49, fixedly attached to supporting frame 20 by any suitable means, which has a transverse hole through which the traveling yarn 46 is threaded. Inside cylindrical member 49 are a pair of flat plates or buttons designated 50 and 51 which bear upon the traveling yarn. Button 51 is connected to a shaft 52, the top of which terminates in a knob 53. Inside cylindrical member 49 and concentric with shaft 52 is a spring 54 which forces button 51 against button 50 with a selectable pressure. The compression applied between buttons 51 and 50 is adjustable by turning knob 55 which is threaded into upright portion 49 as shown and causes the spring 54 to be compressed or relaxed depending upon the direction of rotation of knob 55. In this manner a selectable amount of pretension may advantageously be applied to traveling yarn 46 before it is directed onto the lower outwardly curved surface of the periphery of capstan 12. This selectable pretension acting in cooperation with the peripheral face of capstan 12 enables the tension device of the embodiment shown in FIG. 6 to be advantageously adjustable to provide a much larger range of selectable yarn tensions without encountering difficulty due to overlapping or friction between the multiple turns of yarn trained about the periphery of capstan 12.

Figure 7:
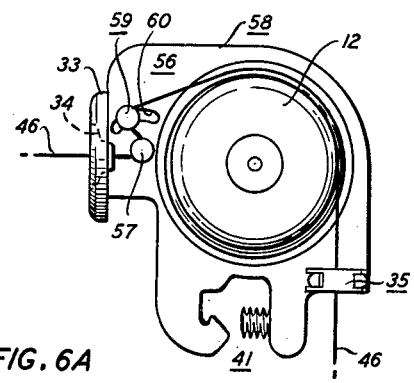
FIG. 7 is a plan view of still a further embodiment of the present invention showing an alternative embodiment of an adjustable pretension device.
Figure 7A:
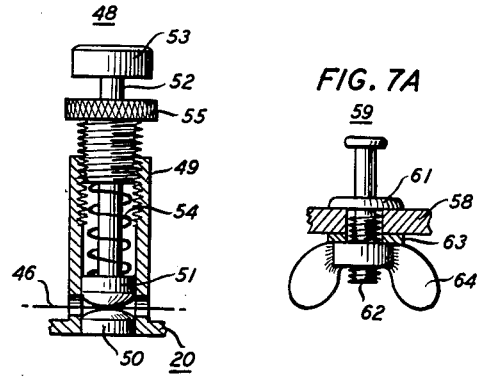
FIG. 7A is an enlarged cross-sectional view of an adjustable post comprising part of the adjustable pretension device of the embodiment of the tension device shown in FIG. 7.

FIG. 7 is a plan view of another illustrative embodiment of a tension device which comprises some of the same elements as the embodiments shown in FIGS. 1 through 6, which elements are identified by corresponding reference numerals. The embodiment shown in FIG. 7 discloses an alternative type of adjustable pretension device indicated generally in the drawing as 56 positioned between inlet yarn guide 33 and capstan 12. As shown in the drawing, adjustable pretension device 56 comprises post 57 fixedly mounted to supporting frame 58 and adjustable post 59 mounted in slot 60 in supporting frame 58. As shown in the enlarged view in FIGS. 7A, post 59 includes an integral cylindrical shoulder 61 and a threaded portion 62 which extends through slot 60 in supporting frame 58. On the lower side of frame 58, post 59 is adjustably secured to frame 58 by means of washer 63 and wing nut 64. Traveling yarn 46 is trained about posts 57 and 59 as shown in FIG. 7 before being applied to capstan 12. The pretension applied to traveling yarn 46 may advantageously be adjusted by loosening wing nut 64 and positioning post 59 in slot 60 to provide the desired pretension.

Figure 8:
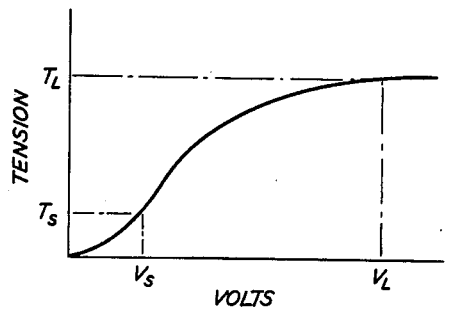
FIG. 8 is a graphical representation of a typical tension versus voltage characteristic of the tension device of the present invention.

The tension devices of the present invention are advantageously adjustable to have substantially identical tension versus voltage characteristics over the complete range of operating voltages for which the devices are designed. FIG. 8 is a graphical representation of a typical tension versus voltage characteristic of the tension device of the present invention and illustrates the manner in which the tension provided by the device varies as the voltage applied to field member 10 is varied. In accordance with this aspect of the invention, each of the tension devices thereof is provided with two adjustments, one an electrical adjustment and the other, a magnetic reluctance adjustment, for determining the tension provided by the devices at any predetermined voltage over the complete range of operating voltages. After each of the devices is assembled, field member 10 thereof is energized by a first preselected voltage designated $V_L$ in FIG. 8 which is in the upper region of the operating voltage for which the device is designed. Pole spider 16 is then adjustably rotated as described hereinbefore by means of knob 23 until the device provides a first predetermined tension $T_L$ at the selected operating voltage $V_L$. Field member 10 is then energized by a second preselected voltage designated $V_S$ in FIG. 8 which is in the lower region of the operating voltage for which the device is designed. Resistance 45 in the input lead 43 is varied to vary the current flowing in coil 13 of field member 10 so as to adjust the device to provide a second predetermined tension $T_S$ shown in FIG. 8. This adjustment is alternately repeated a number of times at the preselected voltages $V_L$ and $V_S$ for each of the devices so that when all of the devices are adjusted in this manner they will have at least two points of coincidence over the complete range of operating voltage. In other words, when voltage $V_L$ is applied to field member 10 of any of the tension devices of the present invention, it will provide tension $T_L$ and, similarly, when voltage $V_S$ is applied to field member 10 of any of the devices, the device will provide tension $T_S$. By selecting the voltages $V_L$ and $V_S$ in the upper and lower regions, respectively, of the range of operating voltage to make the above-described adjustment, the tensions provided by the devices so adjusted at any selected voltage in the operating range will also be substantially uniform. In this the tension versus voltage characteristic of all the devices of the present invention over the complete range of operating voltage will be substantially identical. Thus a plurality of tension devices of the present invention may be controlled by a single control to vary simultaneously the tensions provided by all of the devices while maintaining substantial uniformity thereof.

It is to be understood that the above-described embodiments are but illustrative of the principles of the present invention. Numerous other arrangements may be devised by those skilled in the art without departing from the spirit and scope of the invention.

What is claimed is:

1. In a magnetic torque tension device the combination comprising an electrical coil, a pair of pole spiders each comprising a disk of magnetic material having a plurality of triangularly shaped pole pieces equally spaced about the circumference thereof and depending therefrom, a base member, means for fixedly positioning said coil on said base member, means for rotatably and concentrically positioning one of said pole spiders on one end of said coil with the pole pieces thereof extending away from said base member, means for fixedly and concentrically positioning the other of said pole spiders on the other end of said coil with the pole pieces thereof extending toward said base member and being interdigitated with the pole pieces of said one of said pole spiders, a rotatable ring of magnetic material concentrically positioned with respect to said pole pieces, said ring and said pole pieces having opposing concentric faces, means operatively connected to said ring and responsive to the movement of a traveling filament for concentrically rotating said ring with respect to said pole pieces, energizing means for causing an electrical current to flow in said coil to establish a magnetic couple between said pole pieces and said ring, said magnetic couple opposing the rotation of said ring, and means for adjustably rotating said one of said pole spiders with respect to said other of said pole spiders to vary the strength of said magnetic couple, said last named means comprising an elongated slot in the disk portion of said one of said pole spiders, a cylindrical cam member positioned in said slot and in contacting relationship with the sides of said slot, and means extending through said base member for eccentrically rotating said cam member to rotate said one of said pole spiders with respect to said other of said pole spiders.

2. The combination defined in claim 1 in further combination with means for clamping said one of said pole spiders at any selected position to which it is rotated with respect to said other of said pole spiders, said clamping means comprising a set screw threadable through said base member to a contacting relationship with said disk portion of said one of said pole spiders.

3. The method of adjusting a magnetic torque tension device having a field member and a rotor member to have a substantially predetermined tension versus voltage characteristic over a complete range of operating voltage comprising the steps, one, applying a first predetermined voltage in the upper range of operating voltage to said device, two, adjusting the amount of magnetic flux which couples said field member and said rotor member of said device so that said device provides a first predetermined tension, three, applying a second predetermined voltage in the lower range of operating voltage to said device, four, adjusting the amount of magnetic flux produced by said field member of said device so that said device provides a second predetermined tension, and, five, repeating steps one, two, three and four until said device provides said first and said second predetermined tensions at said first and said second predetermined voltages respectively.

4. The method of individually adjusting a plurality of magnetic torque tension devices to have substantially identical tension versus voltage characteristics over a complete range of operating voltage comprising the steps, one, applying a first predetermined voltage in the upper range of operating voltage to each of said devices, two, individually adjusting the reluctance in the field member of each of said devices so that each provides a first predetermined tension, three, applying a second predetermined voltage in the lower range of operating voltage to each of said devices, four, individually adjusting the current flowing in each of said devices so that each provides a second predetermined tension, and, five, repeating steps one, two, three and four so that each of said devices provides said first and said second predetermined tensions at said first and said second predetermined voltages respectively.

5. In a magnetic torque tension device having a field member including an electrical coil and a plurality of adjacent pole pieces, the method of individually adjusting a plurality of such devices to have substantially identical tension versus voltage characteristics over a complete range of operating voltage comprising the steps, one, applying a first predetermined voltage in the upper range of operating voltage to each of said devices, two, individually adjusting the air gap between adjacent ones of said pole pieces in each of said devices so that each provides a first predetermined tension, three, applying a second predetermined voltage in the lower range of operating voltage to each of said devices, four, individually adjusting the current flowing in the electrical coil of each of said devices so that each provides a second predetermined tension, and, five, repeating steps one, two, three and four so that each of said devices provides said first and said second predetermined tensions at said first and said second predetermined voltages respectively.

References Cited in the file of this patent
UNITED STATES PATENTS

| | | |
|---|---|---|
| 1,745,205 | Bryant | Jan. 28, 1930 |
| 1,852,842 | Greve | Apr. 5, 1932 |
| 2,124,422 | Klein et al. | July 19, 1938 |
| 2,339,449 | Ashton | Jan. 18, 1944 |
| 2,364,375 | Kraft | Dec. 5, 1944 |
| 2,464,493 | Dorey et al. | Mar. 15, 1949 |
| 2,581,142 | Rea | Jan. 1, 1952 |
| 2,705,362 | Roughsedge | Apr. 5, 1955 |
| 2,738,937 | Roughsedge | Mar. 20, 1956 |
| 2,839,697 | Pierce et al. | June 17, 1958 |

FOREIGN PATENTS

| | | |
|---|---|---|
| 189,905 | Great Britain | Dec. 14, 1922 |